(12) United States Patent
Jiang et al.

(10) Patent No.: US 12,418,948 B2
(45) Date of Patent: Sep. 16, 2025

(54) LINK AVAILABILITY AND STATUS INDICATION FOR MULTI-LINK OPERATION IN WLAN

(71) Applicant: Apple Inc., Cupertino, CA (US)

(72) Inventors: Jinjing Jiang, San Jose, CA (US); Yong Liu, Campbell, CA (US); Tianyu Wu, Fremont, CA (US); Su Khiong Yong, Palo Alto, CA (US); Jarkko L. Kneckt, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 17/147,322

(22) Filed: Jan. 12, 2021

(65) Prior Publication Data

US 2021/0219363 A1 Jul. 15, 2021

Related U.S. Application Data

(60) Provisional application No. 62/960,352, filed on Jan. 13, 2020.

(51) Int. Cl.
| | |
|---|---|
| *H04W 76/15* | (2018.01) |
| *H04W 24/08* | (2009.01) |
| *H04W 76/11* | (2018.01) |
| *H04W 76/30* | (2018.01) |
| *H04W 84/12* | (2009.01) |

(52) U.S. Cl.
CPC ......... *H04W 76/15* (2018.02); *H04W 24/08* (2013.01); *H04W 76/11* (2018.02); *H04W 76/30* (2018.02); H04W 84/12 (2013.01)

(58) Field of Classification Search
CPC ..... H04W 76/15; H04W 24/08; H04W 76/11; H04W 76/30; H04W 84/12; H04W 72/082
See application file for complete search history.

(56) References Cited

U.S. PATENT DOCUMENTS

| | | | |
|---|---|---|---|
| 6,904,286 | B1 | 6/2005 | Dantu |
| 9,474,067 | B2 | 10/2016 | Damnjanovic et al. |
| 10,405,319 | B2 | 9/2019 | Shao et al. |
| 10,492,193 | B2 | 11/2019 | Lai et al. |
| 2008/0084819 | A1 | 4/2008 | Parizhsky et al. |
| 2008/0125126 | A1* | 5/2008 | Fang ...................... H04W 36/22 455/436 |
| 2018/0132228 | A1* | 5/2018 | Lan ........................ H04W 74/06 |
| 2018/0160441 | A1* | 6/2018 | Egner ................... H04W 16/14 |
| 2020/0374218 | A1* | 11/2020 | Hygren ................... H04L 47/34 |
| 2021/0076413 | A1* | 3/2021 | Lu ......................... H04W 74/08 |
| 2021/0084711 | A1* | 3/2021 | Park ................... H04W 74/0816 |
| 2022/0225406 | A1* | 7/2022 | Kim ................... H04W 74/0816 |
| 2022/0240333 | A1* | 7/2022 | Jang ........................ H04L 69/24 |

* cited by examiner

*Primary Examiner* — Peter P Chau
(74) *Attorney, Agent, or Firm* — Kowert, Hood, Munyon, Rankin & Goetzel, P.C.

(57) ABSTRACT

This disclosure relates to methods for conducting multilink communications between wireless devices over a wireless local area network (WLAN). A wireless device determines link availability for multiple wireless links of the wireless device. The wireless device transmits link availability information for the multiple wireless links of the wireless device using a first wireless link of the wireless device.

20 Claims, 7 Drawing Sheets

LINK AVAILABILITY AND STATUS INDICATION FOR MULTI-LINK OPERATION IN WLAN

PRIORITY INFORMATION

This application claims priority to U.S. provisional patent application Ser. No. 62/960,352, entitled "Link Availability and Status Indication for Multi-Link Operation in WLAN," filed Jan. 13, 2020, which is hereby incorporated by reference in its entirety as though fully and completely set forth herein.

TECHNICAL FIELD

The present application relates to wireless communication, including techniques and devices for improved performance of a wireless device in a multi-link wireless local area network architecture.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries. Additionally, UEs may be configured to simultaneously communicate over multiple wireless links over a wireless local area network (WLAN). Coordinating activation and deactivation of multiple wireless links may present challenges to obtain benefits of increased throughput and latency reduction while also reducing power consumption. Accordingly, improvements in the field are desired.

SUMMARY

Embodiments are presented herein of, inter alia, systems, apparatuses, and methods for devices for improved performance of a user equipment device in a multi-link wireless local area network (WLAN) environment.

A wireless device may include one or more antennas, one or more radios operably coupled to the one or more antennas, and a processor operably coupled to the one or more radios. The wireless device may be configured to establish a connection with an access point through a wireless local area network (WLAN) over multiple wireless links, or may be an access point configured to establish a connection with one or more other wireless devices through a WLAN over multiple wireless links. The wireless device may operate in each of the multiple wireless links using a respective radio of the one or more radios.

It may be the case that the availability of the wireless links of the wireless device can vary over time. Thus, at least in some instances, the wireless device may determine the availability of its multiple possible wireless links. In some embodiments, the wireless device may transmit an indication through a first link of multiple wireless links, where the indication includes link availability information for the multiple wireless links. The link availability information may include the preferred operation mode for each link. In some embodiments, the wireless links for which availability information is provided may include at least one wireless link that is different from the first wireless link. The indication may, for example, indicate that one or more links are available for the wireless device to use to perform wireless communications through the WLAN, and/or may indicate that one or more links are not currently available for the wireless device to use to perform wireless communications through the WLAN. Such availability information may be useful to other wireless devices associated with the WLAN, for example to determine which wireless links of a wireless device are available at a particular time.

As another possibility, the wireless device may be configured to provide link status information for a wireless link of the wireless device via a different wireless link of the wireless device. For example, if the wireless device is an access point that is busy receiving a transmission from another wireless device on a certain wireless link, the access point could transmit link status information indicating a busy status (e.g., and possibly a busy duration) of that wireless link using a different wireless link. Such a transmission could be useful, for example, in a "hidden node" scenario in which certain wireless devices in the WLAN are each within communication range of the access point but are not within direct communication range of each other.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, unmanned aerial vehicles, unmanned aerial controllers, automobiles and/or motorized vehicles, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device or Station (STA)—any of various types of computer systems or devices that perform wireless communications. A wireless device can be portable (or mobile) or may be stationary or fixed at a certain location. The terms "station" and "STA" are used similarly. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station or Access Point (AP)—The term "Base Station" (also called "eNB") has the full breadth of its ordinary meaning, and at least includes a wireless communication station installed at a fixed location and used to communicate as part of a wireless communication system. The term "access point" is used similarly.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a network infrastructure device. Processors may include, for example: processors and associated memory, circuits such as an ASIC (Application Specific Integrated Circuit), portions or circuits of individual processor cores, entire processor cores, processor arrays, programmable hardware devices such as a field programmable gate array (FPGA), and/or larger portions of systems that include multiple processors, as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, 802.11ad, 802.11ax, 802.11ay, 802.11be, and/or other IEEE 802.11 standards. IEEE 802.11 technology may also be referred to as "Wi-Fi" or "wireless local area network (WLAN)" technology.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
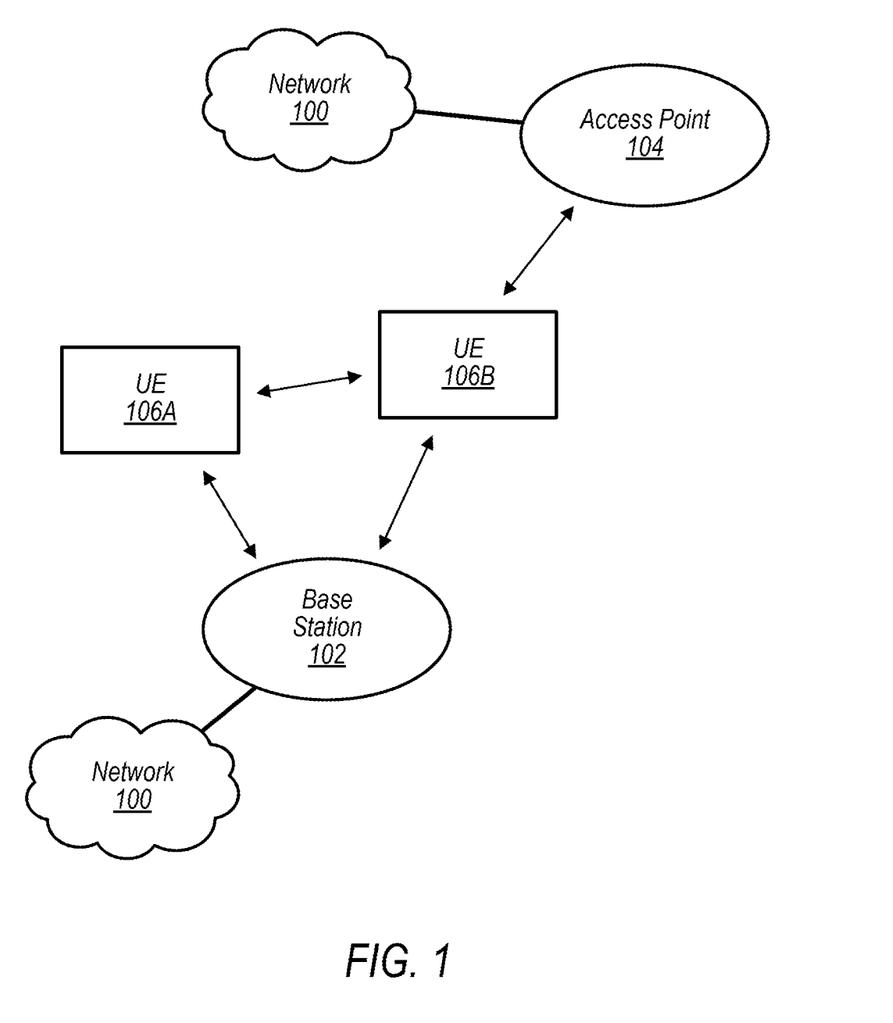
FIG. 1 illustrates an example wireless communication system including a user equipment device (UE), according to some embodiments.
Figure 2:
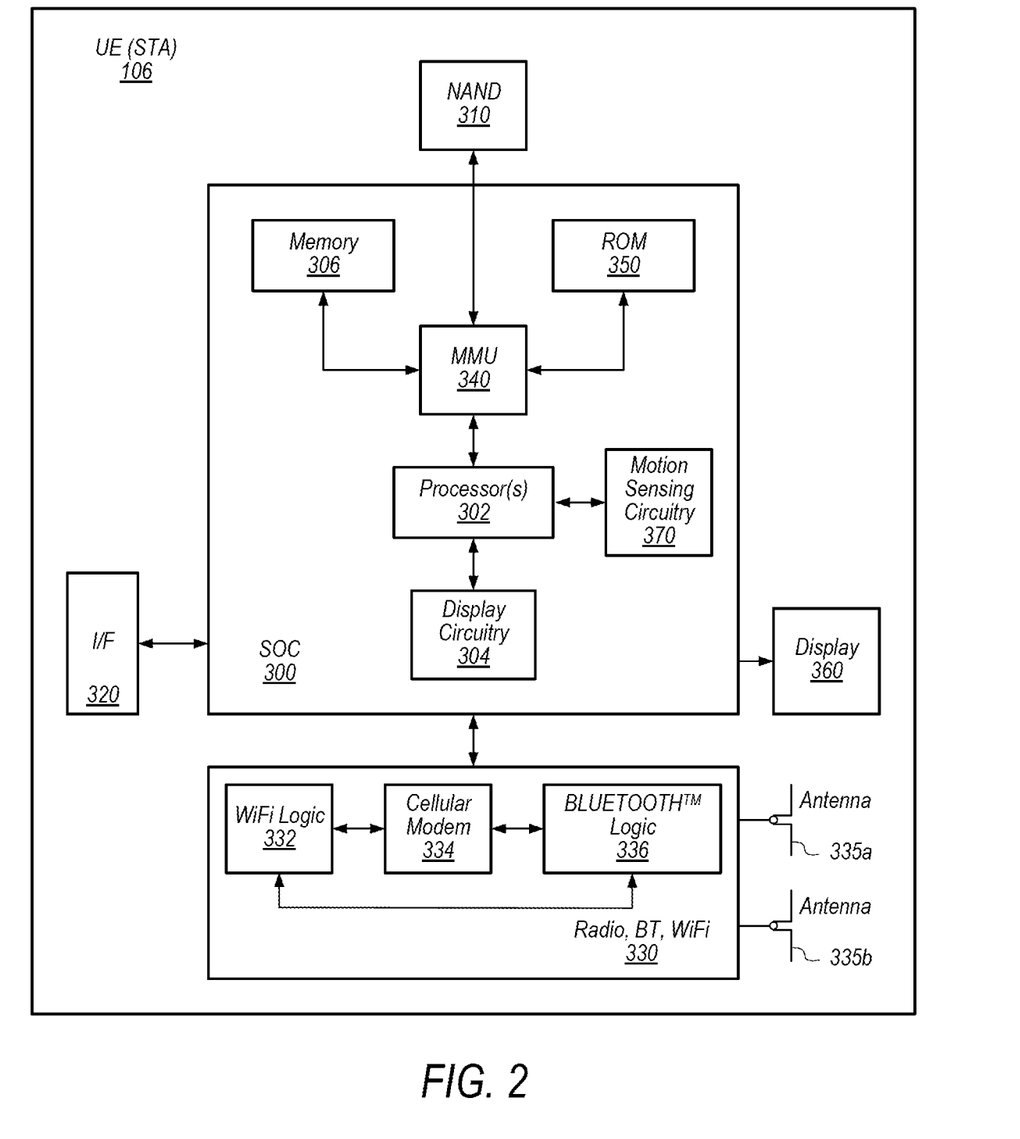
FIG. 2 is a block diagram illustrating an example UE, according to some embodiments.

FIGS. 1-2—Wireless Communication System

FIG. 1 illustrates an example of a wireless communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc. Wireless devices 106A and 106B may be user devices, which may be referred to herein as "user equipment" (UE), UEs, or UE devices.

The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, ay, be and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (associated with, for example, WCDMA or TDS-CDMA air interfaces), LTE, LTE-Advanced (LTE-A), 5G NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of multiple wireless communication technologies. For example, a UE device 106 might be configured to communicate using one or more of GSM, UMTS, CDMA2000, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a WLAN access point (AP) 104, which communicates over a transmission medium with the wireless device 106B. The WLAN access point, which may be a Wi-Fi AP, also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, wearable devices such as smart watches or smart glasses, and/or may include any of various types of devices with cellular communications capability. For example, one or more of the UEs 106A and 106B may be a wireless device intended for stationary or nomadic deployment such as an appliance, measurement device, control device, etc.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The UE 106 may include one or more devices or integrated circuits for facilitating wireless communication, potentially including a cellular modem and/or one or more other wireless modems. The wireless modem(s) may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The wireless modem(s) described herein may be used in a UE device as defined herein, a wireless device as defined herein, or a communication device as defined herein. The wireless modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios, each of which may be configured to communicate via a respective wireless link. Other configurations are also possible.

FIG. 2—Example Block Diagram of a UE Device

FIG. 2 illustrates one possible block diagram of an UE device, such as UE device 106. In some instances (e.g., in an 802.11 communication context), the UE 106 may alternatively be referred to as a station (STA) 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106 to perform Wi-Fi or other WLAN communications on an 802.11 network. The Bluetooth Logic 336 is for enabling the UE device 106 to perform Bluetooth communications. The cellular modem 334 may be a cellular modem capable of performing cellular communication according to one or more cellular communication technologies.

As described herein, UE 106 may include hardware and software components for implementing embodiments of this disclosure. For example, one or more components of the wireless communication circuitry 330 (e.g., Wi-Fi logic 332, cellular modem 334, BT logic 336) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
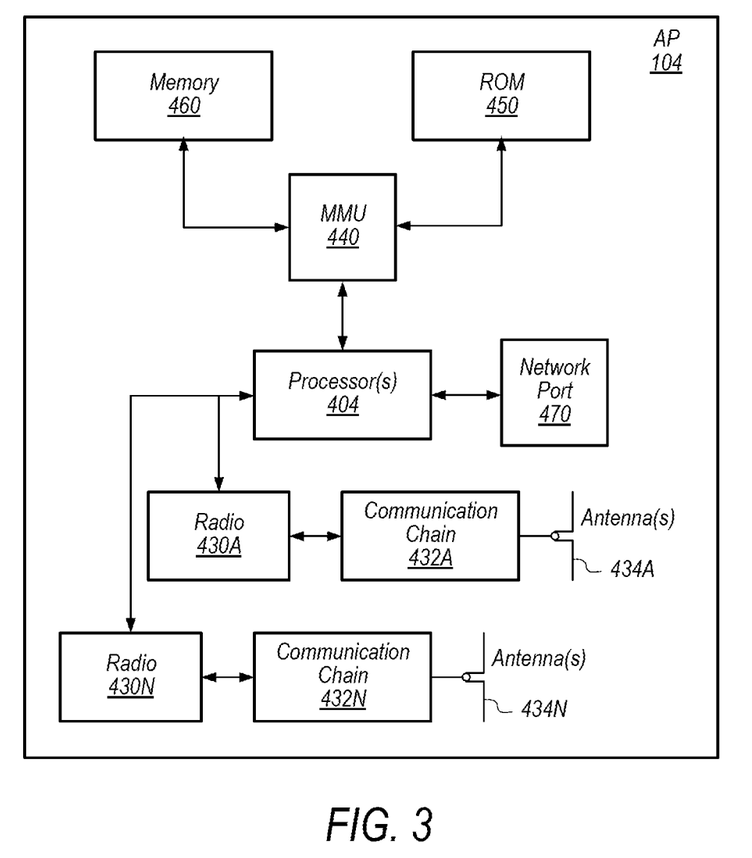
FIG. 3 is a block diagram illustrating an example network element or access point, according to some embodiments.

FIG. 3—Block Diagram of an Access Point

FIG. 3 illustrates an example block diagram of an access point (AP) 104, according to some embodiments. It is noted that the AP of FIG. 3 is merely one example of a possible access point. As shown, AP 104 may include processor(s) 404 which may execute program instructions for the AP 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The AP 104 may include at least one network port 470. The network port 470 may be configured to couple to a telephone network and provide a plurality of devices, such as UE devices 106, access to the telephone network as described above in FIG. 1.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The AP 104 may include one or more radios 430A-430N, each of which may be coupled to a respective communication chain and at least one antenna 434, and possibly multiple antennas. The antenna(s) 434 may be configured to operate as a wireless transceiver and may be further configured to communicate with UE devices 106/107 via radio 430. The antenna(s) 434A-N communicate with their respective radios 430A-N via communication chains 432A-N. Communication chains 432 may be receive chains, transmit chains, or both. The radios 430A-N may be configured to communicate via various wireless communication standards, including, but not limited to, LTE, LTE-A, NR, GSM, UMTS, CDMA2000, Wi-Fi, etc. The UE 104 may be configured to operate in multiple wireless links using the one or more radios 430A-N, wherein each radio is used to operate in a respective wireless link.

The AP 104 may be configured to communicate wirelessly using multiple wireless communication standards. In some instances, the AP 104 may include multiple radios, which may enable the network entity to communicate according to multiple wireless communication technologies. For example, as one possibility, the AP 104 may include an LTE or 5G NR radio for performing communication according to LTE as well as a Wi-Fi radio for performing communication according to Wi-Fi. In such a case, the AP 104 may be capable of operating as both an LTE base station and a Wi-Fi access point. As another possibility, the AP 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the AP 104 may be configured to act exclusively as a Wi-Fi access point, e.g., without cellular communication capability.

As described further subsequently herein, the AP 104 may include hardware and software components for implementing or supporting implementation of features described herein. The processor 404 of the access point 104 may be configured to implement or support implementation of part or all of the methods described herein, e.g., by executing program instructions stored on a memory medium (e.g., a non-transitory computer-readable memory medium) to operate multiple wireless links using multiple respective radios.

Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the AP 104, in conjunction with one or more of the other components 430, 432, 434, 440, 450, 460, 470 may be configured to implement or support implementation of part or all of the features described herein.

Multi-Link Communications Over WLAN

It is anticipated that upcoming implementations of wireless local area networks (WLANs) may utilize multiple links during communications between a wireless station (STA), such as a UE 106 as illustrated in FIG. 2, and a wireless access point (AP) such as the AP 104 illustrated in FIG. 3, in either or both of uplink and downlink communications. The STA may be any of a variety of types of wireless stations, including but not limited to a UE 106, a smart phone, tablet, personal computer, smart watch, accessory device, an unmanned aerial vehicle (UAV), an unmanned aerial controller (UAC), an automobile, or any other type of wireless device capable of communicating over a WLAN.

While the 802.11ax standard allows a STA and an AP to communicate according to either a 5 GHz link or a 2.4 GHz link, for example, it is anticipated that 802.11be may allow a STA and an AP to communicate over multiple links simultaneously, including the 2.4 GHz and 5 GHz links as well as potentially one or more other links (e.g., 6 GHZ), which may improve throughput and reduce communication latency, at least in some instances. For example, a single connection between a STA and an AP may utilize multiple wireless links, each of which operates within the same or a different frequency band. Embodiments herein propose infrastructure power saving mechanisms and other enhancements for a STA operating in multiple links, which may be asynchronous links.

Operating in multiple links may shorten transmission delays, as the associated AP and the STA simultaneously communicate on multiple links and transmissions may be performed over the first available link (e.g., rather than having to wait for a particular link to become available, which may be temporarily congested or otherwise unavailable). Accordingly, a single congested link may be prevented from severely increasing transmission delays, and the duration of transmission delays may be shortened. Additionally, multiple link operation introduces power consumption considerations, as STA power consumption may vary depending on the number of spatial streams and the size of the operating bandwidth. Depending on the STA configuration, operation over multiple links may consume more power than operation over a single link.

To obtain the latency benefits of multiple link operation while mitigating against excess power consumption, it may be desirable for the STA to be able to dynamically activate/make available multiple and/or all of its links to shorten transmission delays, to increase UL and DL throughput, and/or to avoid a single link bottleneck. For example, selected links may be quickly activated to improve throughput capacity according to the quality of service (QOS) needs of an application currently running on the STA. Further, in some embodiments it may be desirable for some or all available links to be dynamically deactivated/made unavailable, e.g., to enter a "doze" or low power state when utilization of multiple links is no longer necessary and/or for any of various other possible reasons. Embodiments described herein include devices and mechanisms to address these and other concerns.

Figure 4:
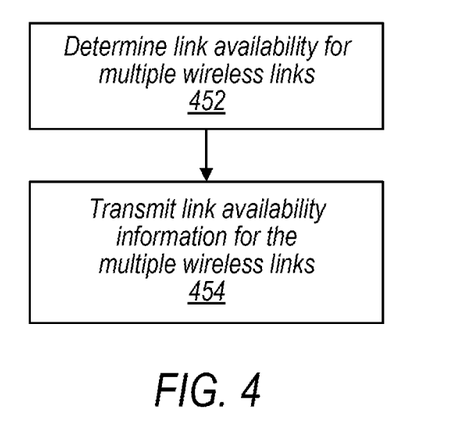
FIG. 4 is a flowchart diagram illustrating a method for providing link availability information for multiple wireless links over a wireless local area network, according to some embodiments.

FIG. 4—Flowchart

FIG. 4 is a flowchart diagram illustrating a method for communication between a wireless station (STA) such as a UE 106 and a wireless access point (AP) such as the AP 104 over a WLAN using multiple wireless links, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 4 may be implemented by a wireless device, such as the AP 104 or UE 106 illustrated in and described with respect to FIGS. 1-3, or more generally in conjunction with any of the computer circuitry, systems, devices, elements, or components shown in the Figures, among others, as desired. For example, a processor (and/or other hardware) of such a device may be configured to cause the device to perform any combination of the illustrated method elements and/or other method elements.

Note that while at least some elements of the method of FIG. 4 are described in a manner relating to the use of communication techniques and/or features associated with IEEE 802.11 specification documents, such description is not intended to be limiting to the disclosure, and aspects of the method of FIG. 4 may be used in any suitable wireless communication system, as desired. As shown, the method may operate as follows.

A first wireless device (e.g., a STA) may determine link availability for multiple wireless links (452). The multiple wireless links may include one or more wireless links with a second wireless device (e.g., an AP STA or a non-AP STA) through a wireless local area network (WLAN). The multiple wireless links may include IEEE 802.11 based wireless links, at least according to some embodiments. Note that the first wireless device may additionally be capable of establishing one or more wireless link(s) using any or all of Bluetooth, Zigbee, near field communication (NFC), and/or any of various other possible short-range communication protocols, according to various embodiments. Additionally, the first wireless device may be capable of performing cellular communication according to 3G, LTE, and/or 5G NR radio access technologies, according to some embodiments. The wireless links may include links in one or more separate frequency bands (e.g., a 2.4 GHz link, a 5 GHz link, a 6 GHz link, and/or other wireless links).

The link availability for the multiple wireless links may be determined in any of various ways, based on any of a variety of possible considerations. As one possibility, a power consumption preference configuration of the first wireless device may be considered when determining the link availability. For example, if the first wireless device has relatively low battery reserves (or otherwise is configured with a preference for reduced power consumption) at a given time, the first wireless device may determine to make one or more wireless links of the first wireless device unavailable.

As another possibility, a load balancing configuration of the wireless device may be considered when determining the link availability. For example, if the first wireless device is an AP, the first wireless device may determine how many and which wireless links to make available based on the current load of the WLAN provided by the AP.

As a still further possibility, one or more in-device coexistence conditions for the first wireless device may be considered when determining the link availability. For example, if the first wireless device is performing wireless communication using a different wireless communication technology in a frequency band that would be interfered with by one or more of the wireless links of the first wireless device, the first wireless device may determine to make those wireless links that would cause the interference unavailable.

As a yet further possibility, wireless medium conditions for one or more of the wireless links may be considered when determining the link availability. For example, if the wireless medium for a wireless link is congested or subject to strong interference, the first wireless device may determine to make that wireless link unavailable.

Note that any or all of such considerations, as well as any of various other possible considerations, may be used independently or in any combination when determining the link availability for the wireless links of the first wireless device.

The first wireless device may transmit link availability information for the multiple wireless links (454). The link availability information may be transmitted in any of various ways, e.g., using any of various possible mechanisms for transmitting control information. For example, as one possibility, the link availability information may be provided using a management frame generated by a media access control (MAC) layer of the wireless device. As another possibility, the link availability information may be provided using one or more A-Control subfields, e.g., as part of the MAC headers of a Wi-Fi communication frame. The link availability information for the multiple wireless links of the first wireless device may be transmitted using a first wireless link of the first wireless device, at least according to some embodiments.

The link availability information could include information indicating whether each of multiple wireless links of the first wireless device is available. For example, the link availability information may include a link ID bitmap, which may include a 1-bit indicator of link availability for each of a plurality of link IDs. In some instances, additional information may be provided for one or more of the wireless links. For example, in some instances, the link availability information may include operating mode indication information (e.g., bandwidth, number of spatial streams, etc.) for one or more of the wireless links for which availability information is provided, such as for any wireless links indicated to be available.

In some instances, the first wireless device may receive link availability information for a multiple wireless links of the second wireless device. The first wireless device may communicate with the second wireless device using a wireless link indicated to be available by the link availability information for the multiple wireless links of the second wireless device, e.g., based at least in part on the link availability information for the multiple wireless links of the second wireless device. Similarly, in some instances, the first wireless device may stop communicating with the second wireless device using a wireless link indicated to be unavailable by the link availability information for the multiple wireless links of the second wireless device, e.g., based at least in part on the link availability information for the multiple wireless links of the second wireless device.

Additionally, or alternatively, in some instances, the first wireless device may transmit link status information for one or more wireless links (e.g., including at least a second wireless link of the wireless device) using the first wireless link. For example, the link status information may include channel information for a frequency channel of any such wireless links and busy duration information for any such wireless links. Such information may be used by other wireless devices to determine when certain frequency channels are in use by the wireless device, potentially including both devices in the same network and devices that are not in the same network. As another possibility, the link status information may include link ID information for the second wireless link and busy duration information for the second wireless link. Such information may be used by other wireless devices in the same network to determine when certain frequency channels are in use by the wireless device.

Similarly, in some instances, the first wireless device may receive link status information for one or more wireless links of another wireless device using a wireless link, such as the first wireless link. Such information may be used by the wireless device to determine when certain frequency channels are in use by other devices.

The wireless device may select one or more wireless links to communicate with another wireless device based at least in part on link status information received from that wireless device and/or one or more other wireless devices, and/or based on link availability information received from that wireless device, according to various embodiments. The wireless devices may communicate wirelessly using the selected wireless link(s).

Thus, according to the method of FIG. 4, it may be possible for wireless devices operating in a wireless local area network to dynamically manage and inform other devices of their wireless link availability and/or status. Such techniques may improve any or all of throughput, reliability, power consumption, and in-device co-existence, among various possible benefits, for example by better matching resource usage to resource demands in the network, while potentially reducing or avoiding at least some possible causes of interference, at least according to some embodiments.

FIGS. 5-9 and Additional Information

FIGS. 5-9 illustrate further aspects that might be used in conjunction with the method of FIG. 4 if desired. It should be noted, however, that the exemplary details illustrated in and described with respect to FIGS. 5-9 are not intended to be limiting to the disclosure as a whole: numerous variations and alternatives to the details provided herein below are possible and should be considered within the scope of the disclosure.

The current generation of Wi-Fi devices commonly include multiple radio chains that make the concurrent operation of multiple radio links possible. Accordingly, multi-link operation may be included as a feature in at least some versions of IEEE 802.11, potentially including 802.11be.

Although it may be possible that STAs can establish multiple wireless links simultaneously, it may not always necessarily be desirable for a STA to utilize all possible links at the same time. For example, there may be any of a variety of possible reasons that certain Wi-Fi links could be designated as unavailable. Such reasons could include power saving considerations, load balancing considerations, in-device co-existence considerations, collision avoidance (e.g., in an interference limited regime) considerations, and/of any various other possible reasons.

Accordingly, it may generally be helpful for a STA to provide peer STAs (or the "neighborhood" in general) an indication of the availability and/or status of some or all possible wireless links of the STA. In some instances, for example, availability and/or status information for all Wi-Fi links of a STA could be conveyed using one of those wireless links.

As one possibility for providing such information, a dedicated management frame (e.g., a MAC management frame) could be provided. As another possibility, a new A-Control subfield could be configured or specified for use in an existing frame. For example, a subfield (e.g., a HE A-Control subfield in a QoS Null, QOS Data, Class 3 Management Frame) with a specified length (e.g., up to 26 bits, as one possibility) could be configured for use for providing such information.

In some instances, use of a new management frame could be specified as not having a specific length limit, which could allow for more information to be provided for each link and/or to provide information relating to more links than a new subfield of an existing management frame, if desired. However, in some instances, transmitting and processing such a frame could potentially take longer than a subfield within an existing frame, e.g., due to greater channel access overhead and processing time at the high MAC management entity, at least in some instances.

Figure 5:
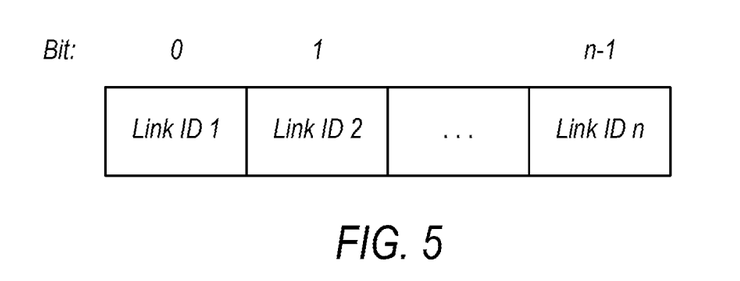
FIGS. 5-6 illustrate aspects of possible management frames that could be used to indicate link availability for multiple wireless links, according to some embodiments.

FIG. 5 illustrates aspects of one possible management frame that could be used to provide link availability information for multiple wireless links of a wireless device in an IEEE 802.11 based wireless local area network, according to some embodiments. In particular, as illustrated, such a management frame may include a link ID bitmap that indicates the availability (or unavailability) of the corresponding link for each of multiple links. To facilitate use of such a link ID bitmap for indicating link availability, link ID information may be provided by an AP providing the WLAN, for example in the Operation Element subfield in Beacon, Probe Response, and/or other communications.

Such a bitmap may be capable of indicating the availability of each of multiple links (e.g., with a '1' value for a given link ID indicating that the link is available, and a '0' value for a given link ID indicating that the link is unavailable, for example such that a all-0 bitmap could be used by a STA to indicate that the STA is going to be unavailable) in a relatively compact manner, e.g., such that it could potentially fit within a A-Control subfield and may not require an entire new management frame to be designed to provide the link availability information. However, the limited information that can be provided in such a bitmap may result in a STA being expected to operate at the maximum capability negotiated at the association for any link indicated to be available. In other words, such a technique may not provide for a STA to indicate that a wireless link is available, but with certain constraints and/or only in a certain operating mode.

According to some embodiments, it may be the case that use of such a link availability bitmap is constrained by certain operation rules. For example, a STA may indicate its available links to peer STAs via such a bitmap if a new link is available; in such a case, peer STAs may be able to utilize the new link to communicate with the STA immediately after receiving the availability indication, at least as one possibility. As another example, a STA may indicate its available links to peer STAs via such a bitmap if an existing link is turned off. In such a scenario, it may be the case that peer STAs should stop using this link right away, and buffered frames for this link are not flushed, at least as one possibility. In some instances, the time to stop use of such a link could be more relaxed, e.g., to extend for a certain (e.g., specified) number of transmit opportunities (TXOPs).

Such an approach could be used in a scenario in which the available links that are indicated in an AP's Operation Element is only a subset of the links that the AP can operate on. The AP may dynamically adjust the subset of links that it is willing to operate on, e.g., considering the radio environment, load considerations, and/or any of various other possible considerations. A non-AP STA in the network may also or alternatively dynamically adjust its link availability, e.g., due to its capability, co-existence requirements with other radios of the STA, and/or any of various other possible considerations.

Figure 6:
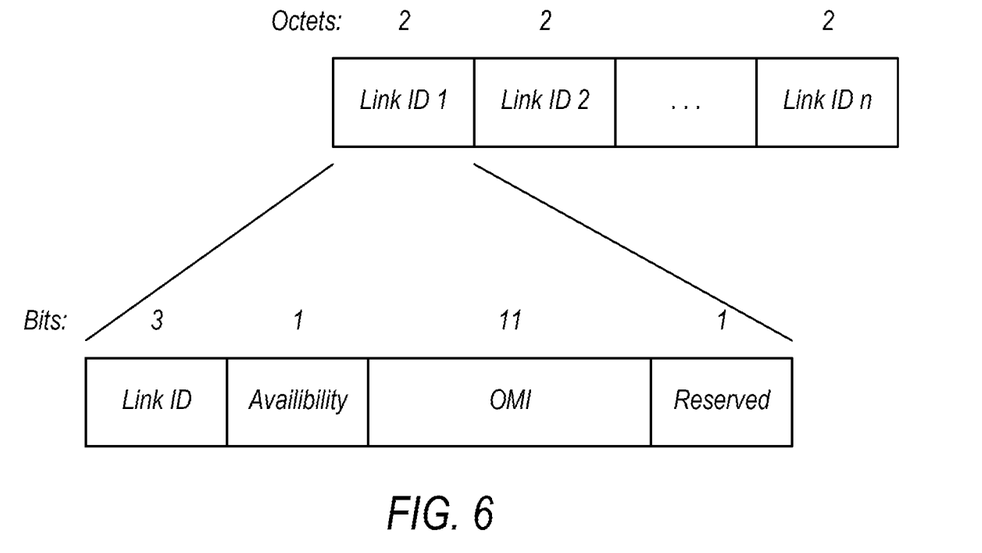

FIG. 6 illustrates aspects of another possible management frame that could be used to provide link availability information for multiple wireless links of a wireless device in an IEEE 802.11 based wireless local area network, according to some embodiments. In particular, as illustrated, such a management frame may include more information for each link ID than in the scenario of FIG. 5, potentially including operating mode information (OMI) information. A new management frame may be used to carry such information, or multiple frames with A-Control subfields corresponding to different links may be used, according to various embodiments. When a link is indicated to be available using such an approach, providing the OMI information may avoid the need to send an operating mode update and allow STAs using the link to go directly to the desired operation mode. When a link is indicated to be unavailable using such an approach, it may be the case that the OMI subfield is omitted. Such an approach may be used to support a non-AP STA providing an indication to the AP of its preferred operation mode, which may include preferred bandwidth, number of spatial streams, and/or any of various other operating parameters, e.g., without need for additional frame exchanges and operation mode changes after the link is made available.

Figure 7:
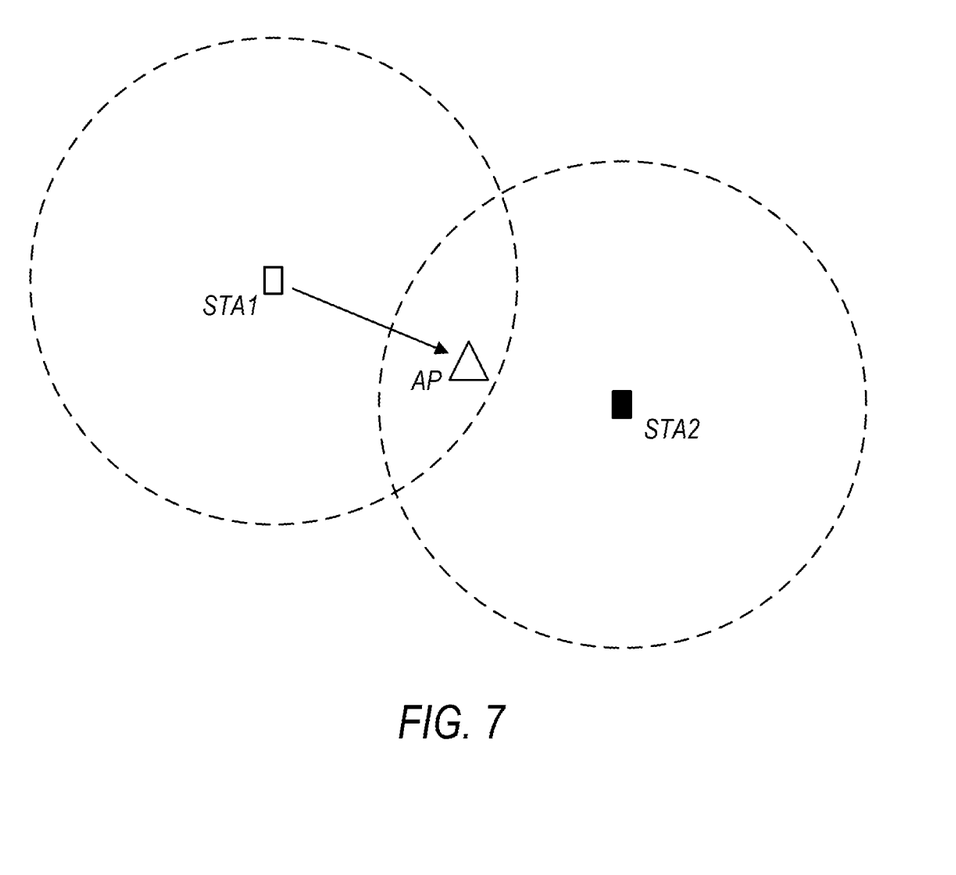
FIG. 7 illustrates aspects of a possible hidden node scenario in which wireless devices may benefit from an access point indicating a busy status of a wireless link via another wireless link, according to some embodiments.

FIG. 7 illustrates aspects of a possible hidden node scenario that could occur in (or in the vicinity of) an IEEE 802.11 based wireless local area network, according to some embodiments. As shown, in the illustrated scenario, it may be the case that one STA (STA2, in the illustrated example) cannot directly receive the signals being transmitted from another STA (STA1, in the illustrated example), which could result in the two STAs performing colliding transmissions. To reduce the likelihood of such a collision occurring, it may be helpful for the AP to indicate the busy status of a link (e.g., after decoding the preamble/MAC header of an ongoing transmission) by notifying the neighborhood through another link. Note that the AP may determine a certain threshold value for busy duration that triggers transmission of a busy status indication for a given link, e.g., such that the AP may not transmit an indication that a link is busy if the busy duration is sufficiently short. If there is a dedicated control link/channel configured in the network, the AP may send link status information indicating that a link is busy immediately upon busy duration information becoming available. Alternatively (or in addition), the first available link (e.g, as determined via a channel contention mechanism such as enhanced distributed channel access (EDCA)) may be used to transmit the link status information once busy duration information is available.

Figure 8:
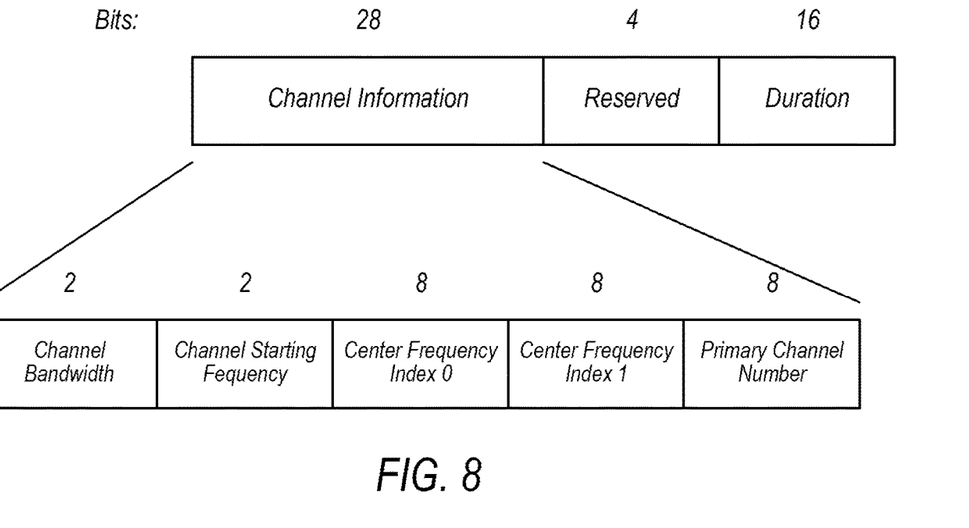
FIGS. 8-9 illustrate aspects of possible management frames that could be used to indicate link status information for one or more wireless links, according to some embodiments.

FIG. 8 illustrates aspects of one such possible management frame that could be used to provide link status information for a wireless link in an IEEE 802.11 based wireless local area network, according to some embodiments. In the scenario of FIG. 8, full channel information and busy duration information may be provided. Such information may be usable by intra-basic service set (BSS) and overlapping BSS (OBSS) STAs to determine the link status of a wireless link; however, it may be the case that a new management frame is needed to carry such full channel information and busy duration information.

Figure 9:
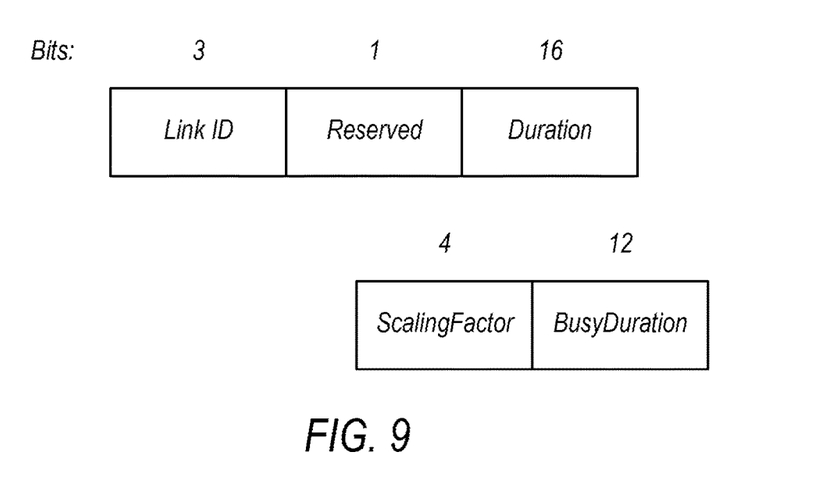

FIG. 9 illustrates aspects of another such possible management frame that could be used to provide link status information for a wireless link in an IEEE 802.11 based wireless local area network, according to some embodiments. In the scenario of FIG. 9, link ID and busy duration information may be provided. Such information may be usable by intra-BSS STAs to determine the link status of a wireless link, and it may be possible to include such information in a A-Control field and/or as part of a new PHY preamble. In some instances, it may be possible for the busy duration field to be compressed using a representation of "ScalingFactor×BusyDuration". Note, though, that in some instances such information may not be sufficient to prevent OBSS STAs from transmitting in a manner that could collide with a transmission on a link that has been indicated to be busy, e.g., since it may possible that STAs outside of the network would be unable to determine the frequency channel of the link that has been indicated to be busy just from the link ID.

In some instances, calculation of the "Duration" or "BusyDuration" value may include deducting the channel access time on the link to send the link status update (e.g., if applicable), and the transmit time for the packet(s) carrying the link status update. A STA that receives such a link status indication may set its network allocation vector (NAV) accordingly for the corresponding link (e.g., operating similarly to a clear-to-send (CTS) frame). If the link status indication is from the same sender, the NAV may still be updated; in such a scenario, there may be the possibility to terminate the previous busy duration. If the link status indication is from a different sender, it may be the case that only the larger NAV is updated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., an AP 104 or a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
configured to, when executing instructions stored in a memory, perform operations comprising:
   determining, based at least in part on link availability of a plurality of wireless links of a wireless device being unknown and one of a power consumption preference configuration of the wireless device or one or more in-device co-existence conditions of the wireless device, the link availability for the plurality of wireless links of the wireless device;
   generating, based at least in part on the determined link availability for the plurality of wireless links of the wireless device, link availability information, wherein the link availability information includes operating mode indication information for one or more wireless links of the plurality of wireless links of the wireless device; and
   transmitting the link availability information for the plurality of wireless links of the wireless device using a first wireless link of the wireless device.

2. The apparatus of claim 1, wherein the link availability information is provided using one or more of:
   a management frame generated by a media access control (MAC) layer of the wireless device; or
   one or more A-Control subfields.

3. The apparatus of claim 1,
   wherein the link availability information is provided using a bitmap included in one or more A-Control subfields,
   wherein the bitmap includes, for a respective wireless link of the plurality of wireless links, a binary indication of whether the respective wireless link is available.

4. The apparatus of claim 3,
   wherein a position in the bitmap is mapped to a Link ID for a respective wireless link of the plurality of wireless links.

5. The apparatus of claim 1,
   wherein the link availability information includes, for each respective wireless link of the plurality of wireless links represented by a Link ID, an indication of an operating mode for the respective wireless link.

6. A method, comprising:
   determining, based at least in part on link availability of a plurality of wireless links of a wireless device being unknown and one of a power consumption preference configuration of the wireless device or one or more in-device co-existence conditions of the wireless device, the link availability for the plurality of wireless links of the wireless device;
   generating, based at least in part on the determined link availability for the plurality of wireless links of the wireless device, link availability information, wherein the link availability information includes operating mode indication information for one or more wireless links of the plurality of wireless links of the wireless device; and
   transmitting the link availability information for the plurality of wireless links of the wireless device using a first wireless link of the wireless device.

7. The method of claim 6, further comprising:
   selecting a first one or more wireless links to communicate with a second wireless device by selecting one or more wireless links of the plurality of wireless links of the wireless device indicated to be available by the link availability information; and
   communicating with the second wireless device using the first one or more wireless links.

8. The method of claim 7, wherein the method further comprises:
   stopping communicating with the second wireless device using a wireless link indicated to be unavailable by the link availability information based at least in part on the link availability information.

9. The method of claim 7, wherein the method further comprises:
   receiving link status information for one or more wireless links of the second wireless device;
   wherein the selecting the first one or more wireless links to communicate with the second wireless device is further based at least in part on the link status information.

10. The method of claim 9,
    wherein the link status information includes frequency channel information and busy duration information.

11. The method of claim 9,
    wherein the link status information includes link ID information and busy duration information.

12. A baseband processor of a wireless device, wherein the baseband processor is configured to perform operations comprising:
    determining, based at least in part on link availability of a plurality of wireless links of the wireless device being unknown and one of a power consumption preference configuration of the wireless device or one or more in-device co-existence conditions of the wireless device, the link availability for the plurality of wireless links of the wireless device;
    generating, based at least in part on the determined link availability for the plurality of wireless links of the wireless device, link availability information, wherein the link availability information includes operating mode indication information for one or more wireless links of the plurality of wireless links of the wireless device; and
    transmitting the link availability information for the plurality of wireless links of the wireless device using a first wireless link of the wireless device.

13. The baseband processor of claim 12,
    wherein the link availability information is provided using one or more of:
    a management frame generated by a media access control (MAC) layer of the wireless device; or
    one or more A-Control subfields.

14. The baseband processor of claim 12,
    wherein the link availability information includes a link ID bitmap, wherein the link ID bitmap includes a 1-bit indicator of link availability for a respective link ID of a plurality of link IDs.

15. The baseband processor of claim 12,
    wherein the link availability information includes operating mode indication information for each of a plurality of link IDs of the wireless device.

16. The baseband processor of claim 12, wherein the baseband processor is further configured to perform operations comprising:
    receiving link availability information for a plurality of wireless links of a second wireless device;

communicating with the second wireless device using a wireless link indicated to be available by the link availability information for the plurality of wireless links of the second wireless device based at least in part on the link availability information for the plurality of wireless links of the second wireless device.

17. The baseband processor of claim 12, wherein the baseband processor is further configured to perform operations comprising:

receiving link availability information for a plurality of wireless links of a second wireless device;

stopping communicating with the second wireless device using a wireless link indicated to be unavailable by the link availability information for the plurality of wireless links of the second wireless device based at least in part on the link availability information for the plurality of wireless links of the second wireless device.

18. The baseband processor of claim 12, wherein the baseband processor is further configured to perform operations comprising:

transmitting link status information for a second wireless link of the wireless device using the first wireless link, wherein the link status information includes busy duration information and one or more of link ID information for the second wireless link or channel information for a frequency channel of the second wireless link.

19. The baseband processor of claim 12, wherein the plurality of wireless links include IEEE 802.11 based wireless links.

20. The baseband processor of claim 12, wherein the link availability information is provided using a bitmap included in one or more A-Control subfields, wherein the bitmap includes, for a respective wireless link of the plurality of wireless links, a binary indication of whether the respective wireless link is available.

* * * * *